United States Patent
Jaradi et al.

(10) Patent No.: US 9,821,758 B2
(45) Date of Patent: Nov. 21, 2017

(54) PRETENSIONING, FORCE-LIMITING SEAT BELT ASSEMBLY

(71) Applicant: Ford Global Technologies, LLC, Dearborn, MI (US)

(72) Inventors: Dean M. Jaradi, Macomb, MI (US); Mohammed Shenaq, Dearborn, MI (US); Mohammed Omar Faruque, Ann Arbor, MI (US); S. M. Iskander Farooq, Novi, MI (US); Robert William McCoy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/016,311

(22) Filed: Feb. 5, 2016

(65) Prior Publication Data
US 2017/0225644 A1    Aug. 10, 2017

(51) Int. Cl.
*B60R 22/195* (2006.01)
*B60R 22/28* (2006.01)

(52) U.S. Cl.
CPC ........ *B60R 22/195* (2013.01); *B60R 22/1951* (2013.01); *B60R 22/28* (2013.01); *B60R 2022/287* (2013.01)

(58) Field of Classification Search
CPC ... B60R 22/195; B60R 22/1951; B60R 22/28; B60R 2022/287
USPC ........................................................ 280/806
See application file for complete search history.

(56) References Cited

U.S. PATENT DOCUMENTS

| 4,738,485 | A | * | 4/1988 | Rumpf | B60N 2/4221 |
| | | | | | 280/806 |
| 5,908,219 | A | | 6/1999 | Böhmler | |
| 5,924,729 | A | * | 7/1999 | Gleason | B60R 22/28 |
| | | | | | 188/371 |
| 6,068,664 | A | * | 5/2000 | Meyer | B60R 22/28 |
| | | | | | 280/806 |
| 6,565,121 | B2 | * | 5/2003 | Knych | B60R 22/1951 |
| | | | | | 280/806 |
| 7,607,687 | B2 | * | 10/2009 | Clute | B60R 21/18 |
| | | | | | 242/374 |
| 8,091,923 | B2 | | 1/2012 | Dong | |
| 8,191,814 | B2 | * | 6/2012 | Yamada | B21C 23/205 |
| | | | | | 242/374 |

(Continued)

FOREIGN PATENT DOCUMENTS

KR    20030034651    5/2003

OTHER PUBLICATIONS

Wang et al., "A Seat Belt Buckle Pretensioner and Load-Limiter Combo Device", General Motors Corporation, Paper No. 144 (7 pages).

*Primary Examiner* — Faye M Fleming
(74) *Attorney, Agent, or Firm* — Frank A. MacKenzie; Bejin Bieneman PLC

(57) ABSTRACT

A seat belt assembly for a vehicle includes a pretensioner, and a cable connected to the pretensioner. The seat belt assembly includes a torsion bar having a plurality of teeth. The cable has slots interlocking with the teeth. During a sensed impact of the vehicle, the pretensioner is activated to retract the cable to pretension the seat belt assembly relative to an occupant of the vehicle. The interlocking of the slots with the teeth exerts torsional forces on the torsion bar, which yields to reduce forces on a chest of the occupant.

20 Claims, 6 Drawing Sheets

(56) References Cited

U.S. PATENT DOCUMENTS

| | | | |
|---|---|---|---|
| 8,230,558 B2 | 7/2012 | Wendt et al. | |
| 8,573,648 B2 * | 11/2013 | Park | B60R 22/03 242/374 |
| 2003/0047931 A1 | 3/2003 | Rees et al. | |
| 2003/0107209 A1 * | 6/2003 | Haig | B60R 21/08 280/749 |

* cited by examiner

PRETENSIONING, FORCE-LIMITING SEAT BELT ASSEMBLY

BACKGROUND

A seat belt assembly includes webbing and may function to pretension the webbing and to limit force on the webbing. Specifically, the seat belt assembly may pretension the webbing by pulling the webbing toward the occupant when an impact is detected. This tightening can help prevent "submarining," i.e., when the occupant slides forward underneath the webbing. The seat belt assembly may limit the force applied to a chest of the occupant when the force on the chest exceeds a threshold force by slightly releasing the webbing.

What is needed is a way to attach a force limiter and a pretensioner to a seat belt buckle that results in a simple, cost-effective design.

DETAILED DESCRIPTION

Figure 1:
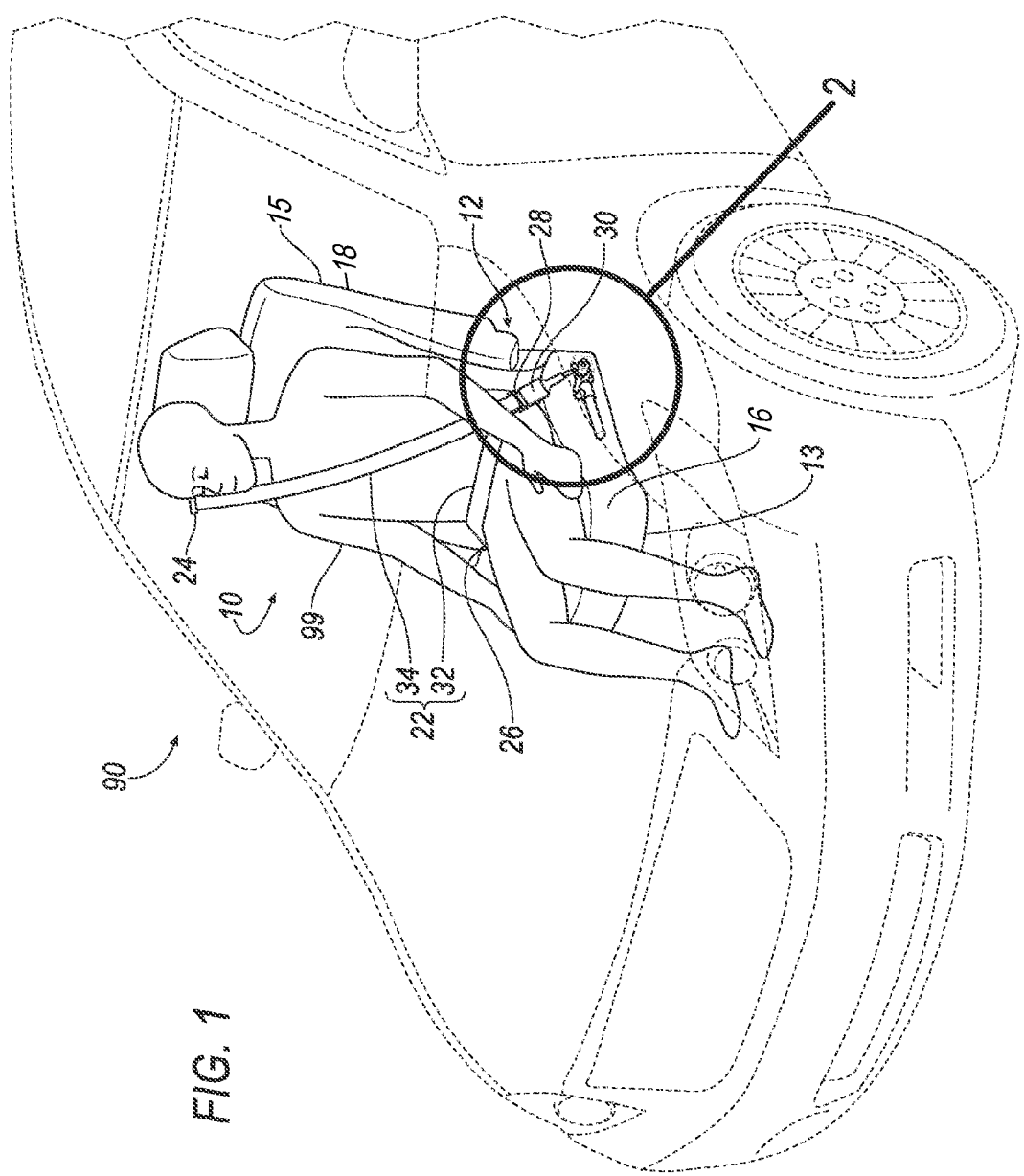
FIG. 1 is a perspective view of a seat including a seat belt assembly in a vehicle

With reference to the Figures, wherein like numerals indicate like parts throughout the several views, a seat belt assembly 20 includes a pretensioner 40, a cable 50 connected to the pretensioner 40, and a torsion bar 60 having a plurality of teeth 70. The cable 50 has slots 52 interlocking with the teeth 70.

The seat belt assembly 20 provides both pretensioning and force limiting in a single, compact package. Furthermore, the seat belt assembly 20 distributes the force limiting provided by the torsion bar 60 across both a lap band 32 and a shoulder band 34 rather than concentrating the effects of the force limiting in the shoulder band 34. The seat belt assembly 20 reduces complexity by having a low number of parts.

Figure 2:
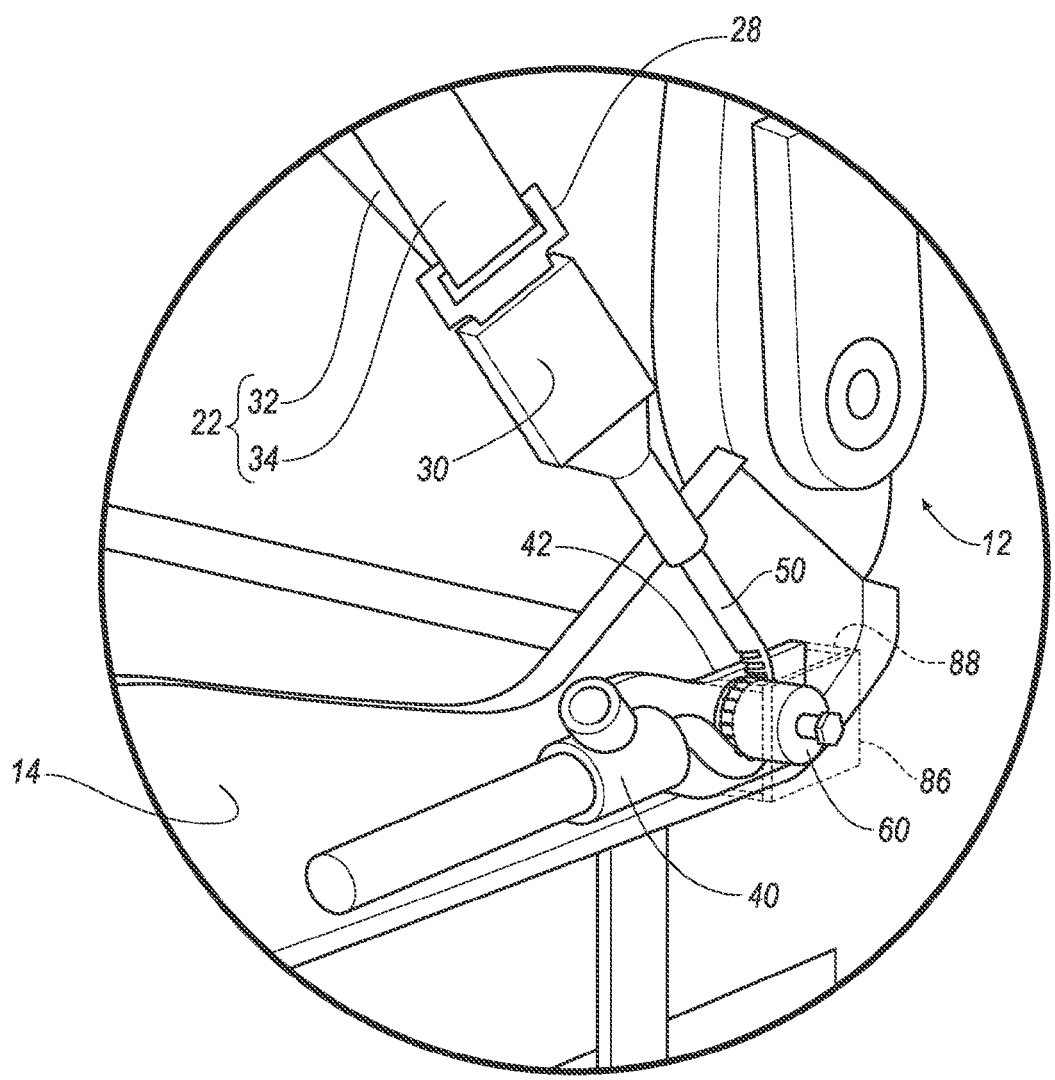
FIG. 2 is a perspective view of a portion of the seat belt assembly attached to a portion of a frame of the seat.

With reference to FIGS. 1 and 2, a seat assembly 10 in a vehicle 90 includes a seat 12 having a seat frame 14 and the seat belt assembly 20. The seat 12 supports an occupant 99 in a seated position and may include cushions 16, 18. The seat 12 may include a seat bottom 13 and a seat back 15. The seat frame 14 may extend across the seat bottom 13 and the seat back 15.

The seat 12 may be a front seat or a rear seat, and may be in any cross-vehicle position. The seat 12 shown in FIG. 1 is a bucket seat, but alternatively the seat 12 may be a bench seat or another type of seat. The seat frame 14 is a rigid structure that supports the seat cushions 16, 18, and the seat frame 14 may recline based on inputs from the occupant 99.

The seat belt assembly 20, when fastened, retains the occupant 99 on the seat 12, e.g., during sudden decelerations of the vehicle 90. The seat belt assembly 20 may include webbing 22, a retractor 24, a lap belt mounting 26, and a clip 28 that engages a buckle 30. The retractor 24 may be attached to a body (not numbered) of the vehicle, e.g., a B pillar (not numbered) in the instance the seat 12 is a front seat, to a C pillar (not numbered) when the seat 12 is a rear seat, etc. The retractor 24 may alternatively be mounted to the seat frame 14.

The lap belt mounting 26 attaches one end of the webbing 22 to the seat frame 14. The other end of the webbing 22 feeds into the retractor 24, which may include a spool (not numbered) that extends and retracts the webbing 22. The clip 28 slides freely along the webbing 22 and, when engaged with the buckle 30, divides the webbing 22 into a lap band 32 and a shoulder band 34.

The seat belt assembly 20 of FIG. 1 is a three-point harness, meaning that the webbing 22 is attached at three points around the occupant 99 when fastened: the lap-belt mounting 26, the retractor 24, and the buckle 30. The seat belt assembly 20 may, alternatively, include another arrangement of attachment points.

Figure 3:
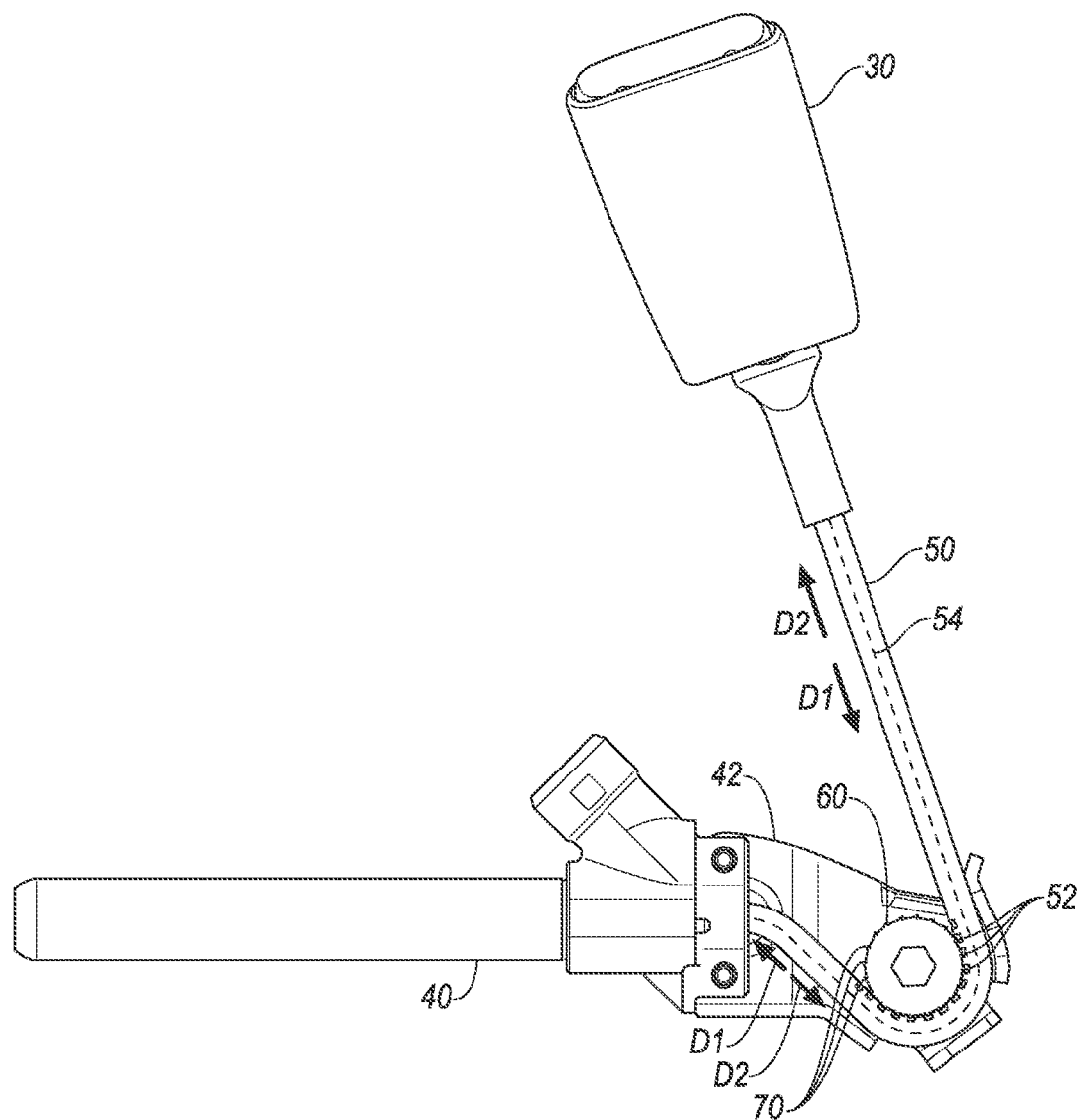
FIG. 3 is a side view of a seat belt assembly.
Figure 4:
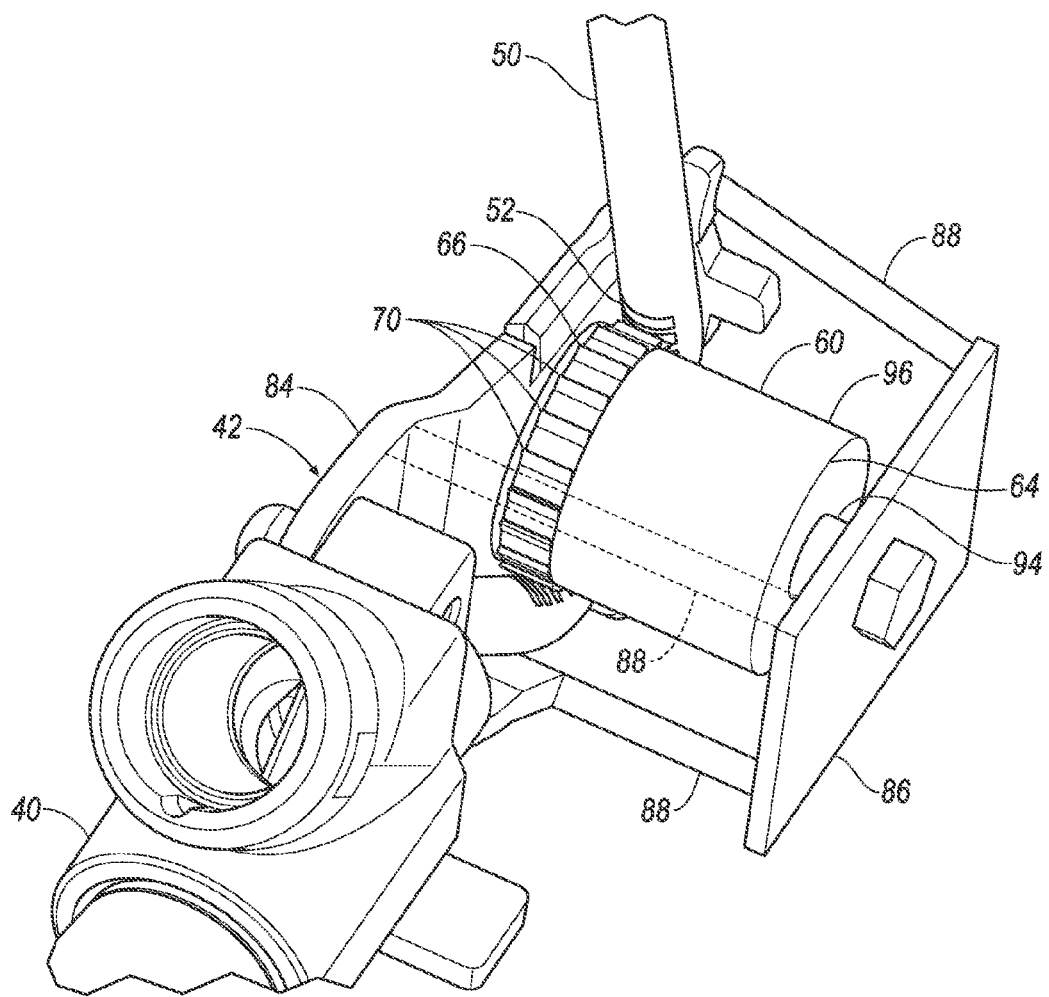
FIG. 4 is a perspective view of the seat belt assembly.

With reference to FIGS. 3 and 4, the seat belt assembly 20 includes a bracket 42 attached to the seat frame 14, i.e., at the seat bottom 13. Alternatively, the bracket 42 may be integral with the seat frame 14, i.e., formed together simultaneously as a single continuous unit. The bracket 42 may support the pretensioner 40 and/or the torsion bar 60. The bracket 42 may be formed of any suitable material, e.g., metal or plastic. The bracket 42 may include a first plate 84, a second plate 86, and cross-members 88 fixing the first plate 84 to the second plate 86. Either the first plate 84 or the second plate 86 may, for example, be directly connected to the seat frame 14.

The seat belt assembly 20 includes a ratcheting means 78 for permitting the cable 50 to freely slide in a first direction D1 and to lock in a second direction D2 opposite the first direction D1 unless a minimum tensile force is applied to the cable 50. As one example, this means 78 may be the torsion bar 60 having the plurality of teeth 70, and the cable 50 having slots 52 interlocking with the teeth 70, as shown in FIGS. 2-5 and as described further below, and structural equivalents thereof.

With reference to FIG. 4, the torsion bar 60 may be attached to the bracket 42. Specifically, the torsion bar 60 has a first end 64 fixed to the bracket 42, e.g., to the second plate 86 of the bracket 42, and a second end 66 spaced from the first end 64. The adjectives "first" and "second" are used throughout this document as identifiers and are not intended to signify importance or order. The first end 64 may be directly connected to the bracket 42, as shown in FIG. 3, or may be indirectly attached to the bracket 42 with one or more intermediate components (not shown). The first end 64 of the torsion bar 60, alternatively, may be connected directly to seat frame 14, or indirectly with one or more intermediate components (not shown) other than the bracket 42.

The second end 66 may be rotationally free relative to the bracket 42. For example, the second end 66 may be unattached from the bracket 42, e.g., the torsion bar 60 may be cantilevered by the first end 64, as shown in FIG. 4. Alternatively, the second end 66 may be rotatably attached to the bracket 42, e.g., with a bolt, pin, etc., to permit rotational movement of the second end 66 relative to the bracket 42.

The torsion bar 60 may be designed to rotationally yield, e.g., plastically deform, as the torsion bar 60 is rotated by the cable 50, as described further below. In particular, the torsion bar 60 may be formed of suitable shape, dimension, and material to yield when subjected to a threshold rotational force.

As one example, with reference to FIG. 4, the torsion bar 60 may include a shaft 94 at the first end 64, and a barrel 96 at the second end 66. The barrel 96 may have a larger diameter than the shaft 94. This larger diameter a moment applied by the cable 50 to the torsion bar 60 and encourages yielding at the shaft 94. The shaft 94 has a known elasticity so that when the torsion bar 60 is subjected to a given torque about the second end 66, the second end 66 will yield rotationally by a predictable amount. The shaft 94 and the barrel 96 may be integral with each other, e.g., formed together simultaneously as a single continuous unit. Alternatively, the shaft 94 and the barrel 96 may be formed separately and subsequently attached together.

Figure 5:
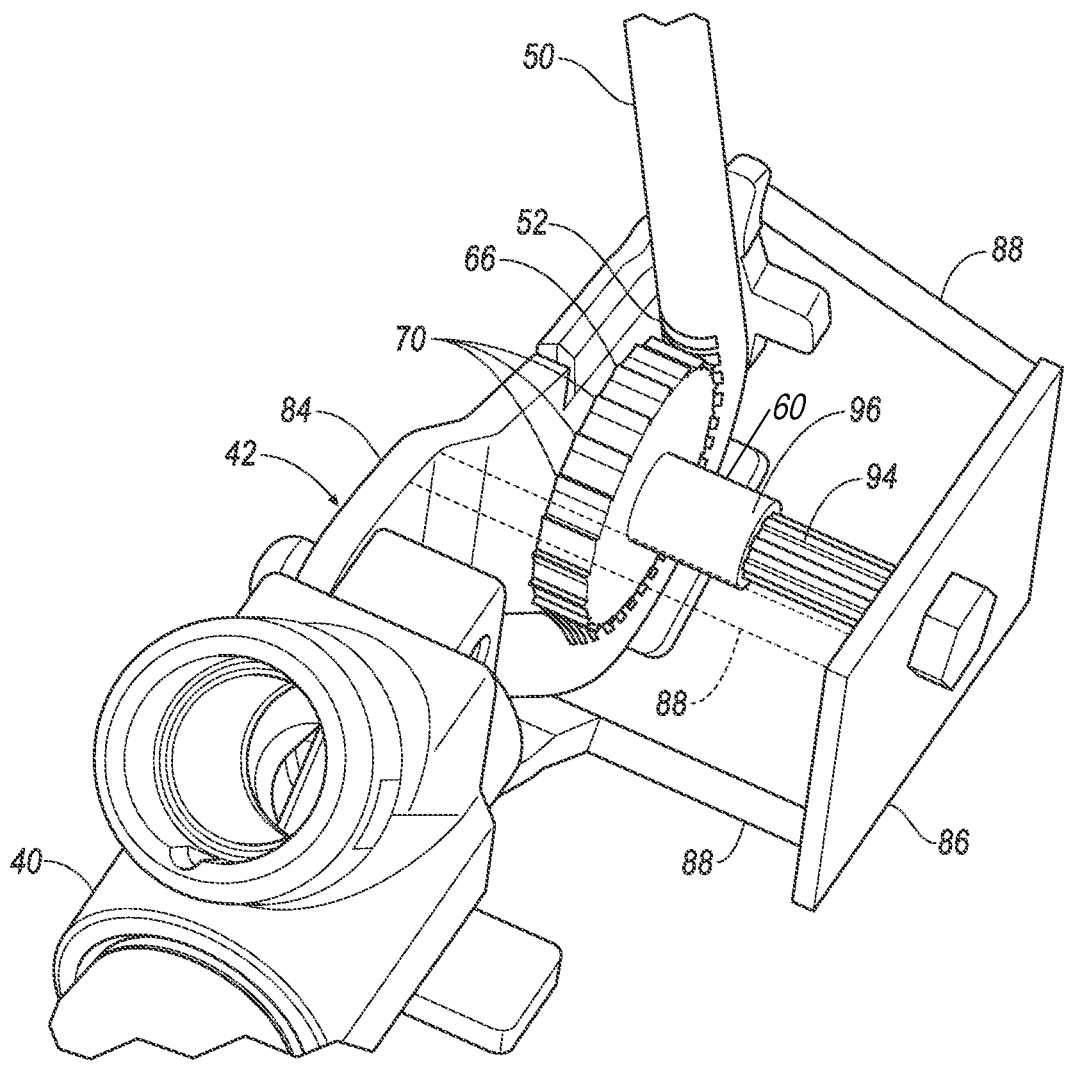
FIG. 5 is a perspective view of another embodiment of the seat belt assembly.

As another example, with reference to FIG. 5, the shaft 94 and the barrel 96 may be splined. Specifically, the splined barrel 96 may slideably receive the splined shaft 94, and the barrel 96 and shaft 94 are rotationally fixed to each other, i.e., rotate together as a unit.

As set forth further below, the rotational yield of the torsion bar 60 may reduce forces on a chest of the occupant by the webbing 22. In other words, during an impact of the vehicle 90, the retractor 24 locks the webbing 22 to prevent extension of the webbing 22 from the retractor 24. As the occupant moves forward, e.g., during a front end impact, the occupant is forced against the webbing 22, and the webbing 22 may apply forces to the chest of the occupant. The torsion bar 60 is designed to rotationally yield when subjected to a threshold force resulting from the occupant being forced against the webbing 22.

Figure 6:
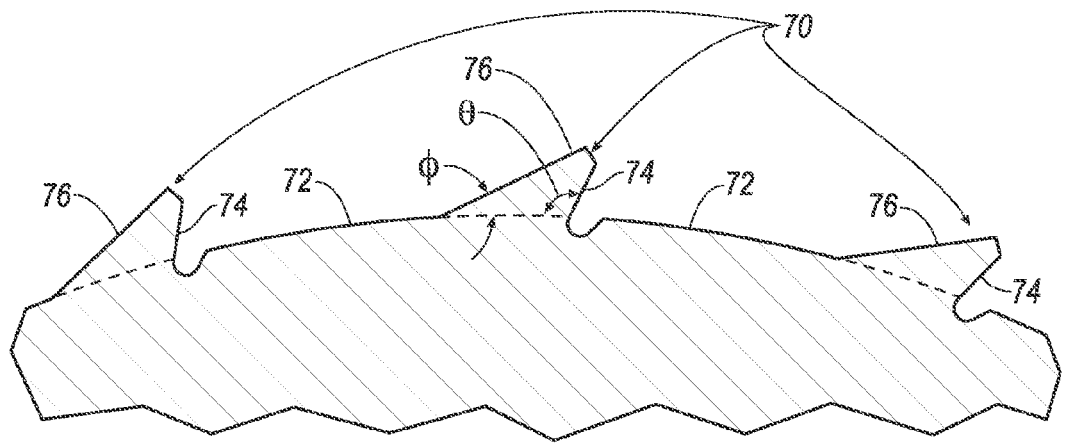
FIG. 6 is a partial side view of an end of a torsion bar.

The torsion bar 60 has a plurality of teeth 70, which are aligned circumferentially around the second end 66, e.g., on the barrel 94. With reference to FIG. 6, the plurality of teeth 70 extend radially from the barrel 94. The torsion bar 60 may include a base 72 between the teeth 70. Each of the teeth 70 has a catching side 74 and a releasing side 76 each extending from the base 72.

The catching sides 74 each have an internal angle θ relative to the base 72, that is, the angle on the inside of the tooth between the catching side 74 and the tangent line to the base 72 where the catching side 74 meets the base 72. Similarly, the releasing sides 76 each have an internal angle φ relative to the base 72, that is, the angle on the inside of the tooth between the releasing side 76 and the tangent line to the base 72 where the releasing side 76 meets the base 72. The internal angle θ of each catching side 74 is greater than the internal angle φ of each releasing side 76.

Figure 7:
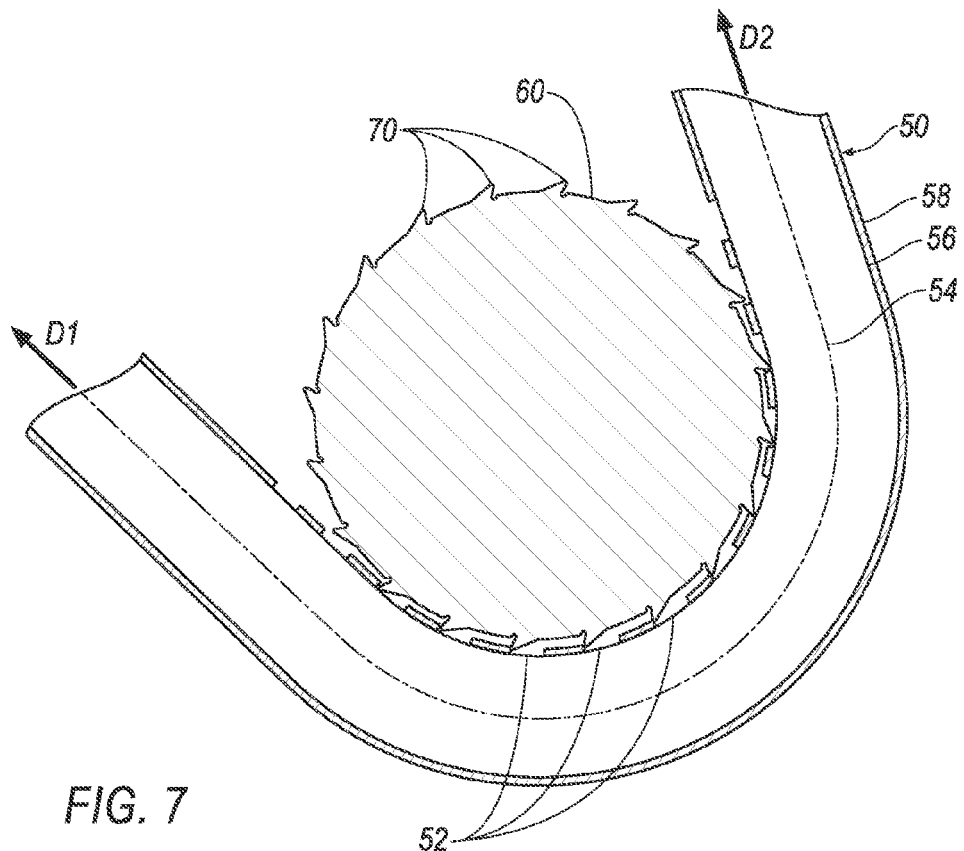
FIG. 7 is a cross-sectional view of the torsion bar and a cable.

With reference to FIGS. 3, 4, and 7, the cable 50 is connected to the pretensioner 40. The cable 50 is also connected to the seat belt buckle 30. The cable 50 has slots 52 interlocking with the teeth 70 of the torsion bar 60. The slots are spaced along an axis 54 of the cable 50. The cable 50 extends from the pretensioner 40 around the torsion bar 60 to the buckle 30.

The cable 50 may include a sleeve 58 and a cord 56 extending through the sleeve 58 coaxially with the sleeve 58. The cord 56 may be formed of any suitable material, e.g., metal. The cord 56 may be flexible relative to the sleeve 58 and may axially reinforce the sleeve 58 when the cable 50 is in tension.

The sleeve 58 may define the slots 52. The sleeve 58 may be flexible relative to the torsion bar 60 to wrap around the torsion bar 60, as shown in FIGS. 3, 4, and 7. For example, the sleeve 58 may be a shell that surrounds the cord 56 and may be formed of a suitable material and thickness such that the sleeve 58 is flexible relative to the torsion bar 60. As another example, the sleeve 58 may be a mesh that surrounds the cord 56 and defines the slots 52. In other words, the teeth 70 of the torsion bar 60 may engage the slots 52 defined by the mesh. As another example, the sleeve 58 may include a series of interlocking shells that may be, for example, articulated relative to each other. The sleeve 58 may be formed of any suitable material, e.g., metal.

The pretensioner 40 may be directly or indirectly connected to the bracket 42 and/or the seat frame 14. The pretensioner 40 may be of any suitable type, such as a ball-in-tube pretensioner, in which an explosive charge propels a ball or balls over a cogwheel connected to the cable 50; a piston pretensioner, in which an explosive charge drives a piston attached to the cable 50; a mechanical pretensioner, in which a compressed spring attached to the cable 50 is released; or any other suitable type. The pretensioner 40 is activated by a processing device 80 in communication with an impact sensor 82, which may be located in a front bumper (not numbered) of the vehicle 90. As set forth further below, the pretensioner 40 retracts the cable 50.

In the event that the vehicle 90 is involved in an impact, the impact sensor 82 detects the impact event and signals the processing device 80, which activates the pretensioner 40. The pretensioner 40 retracts the cable 50, and the slots 52 of the cable 50 slide over the releasing sides 76 of the teeth 70. This retraction tightens the lap band 32 and shoulder band 34 against the occupant 99, which may prevent "submarining," in which the occupant 99 would slide forward under the lap band 32. As momentum carries the occupant 99 forward, the occupant 99 pulls against the lap band 32 and shoulder band 34, which both pull the cable 50 in tension via the clip 28 engaged with the buckle 30. The slots 52 of the cable 50 engage and pull against the catching sides 74 of the teeth 70, which applies a torque to the torsion bar 60. The torsion bar 60 rotationally yields, allowing the cable 50 to extend and limiting the force applied by the webbing 22 against the occupant 99. Thus, the torsion bar 60 provides ratcheting means 62 to permit the cable 50 to freely slide in a first direction and to lock in a second direction opposite the first direction unless a minimum tensile force is applied to the cable 50. The momentum of the occupant 99 may be further arrested, at this point, by an airbag (not numbered). The force limiting provided by the torsion bar 60 may reduce forces on the chest of the occupant 99 by the webbing 22.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A seat belt assembly comprising:
a pretensioner;
a cable connected to the pretensioner;
a torsion bar having a plurality of teeth; and
a seat belt buckle connected to the cable;
wherein the cable has slots interlocking with the teeth.
2. A seat belt assembly comprising:
a pretensioner;
a cable connected to the pretensioner; and
a torsion bar having a plurality of teeth, wherein the cable has slots interlocking with the teeth;
the torsion bar includes a base;
each of the teeth has a catching side and a releasing side each extending from the base;
the catching sides and the releasing sides each have an internal angle relative to the base; and the internal angle of each catching side is greater than the internal angle of each releasing side.

3. The seat belt assembly according to claim 1, wherein the torsion bar includes a base;
    each of the teeth has a catching side and a releasing side each extending from the base;
    the catching sides and the releasing sides each have an internal angle relative to the base; and
    the internal angle of each catching side is greater than the internal angle of each releasing side.

4. The seat belt assembly according to claim 1, further comprising a bracket supporting the pretensioner and the torsion bar.

5. The seat belt assembly according to claim 4, wherein the torsion bar has a first end fixed to the bracket and a second end spaced from the first end, the plurality of teeth being aligned circumferentially around the second end.

6. The seat belt assembly according to claim 1, wherein the cable includes sleeve and a cord extending through the sleeve coaxially with the sleeve, the sleeve defining the slots.

7. The seat belt assembly according to claim 1, wherein the slots are spaced along an axis of the cable.

8. The seat belt assembly according to claim 1, wherein the cable is formed of metal.

9. The seat belt assembly according to claim 2, further comprising a seat belt buckle connected to the cable.

10. The seat belt assembly of claim 2, further comprising a bracket supporting the pretensioner and the torsion bar.

11. The seat belt assembly of claim 2, wherein the cable includes sleeve and a cord extending through the sleeve coaxially with the sleeve, the sleeve defining the slots.

12. A seat belt assembly comprising:
    a pretensioner;
    a cable connected to the pretensioner;
    a torsion bar having a plurality of teeth; and
    a bracket supporting the pretensioner and the torsion bar wherein the cable has slots interlocking with the teeth.

13. The seat belt assembly of claim 12, further comprising a seat belt buckle connected to the cable.

14. The seat belt assembly of claim 12, wherein the torsion bar has a first end fixed to the bracket and a second end spaced from the first end, the plurality of teeth being aligned circumferentially around the second end.

15. The seat belt assembly of claim 12, wherein the torsion bar includes a base;
    each of the teeth has a catching side and a releasing side each extending from the base;
    the catching sides and the releasing sides each have an internal angle relative to the base; and
    the internal angle of each catching side is greater than the internal angle of each releasing side.

16. The seat belt assembly of claim 12, wherein the cable includes sleeve and a cord extending through the sleeve coaxially with the sleeve, the sleeve defining the slots.

17. A seat belt assembly comprising:
    a pretensioner;
    a cable connected to the pretensioner; and
    a torsion bar having a plurality of teeth, wherein the cable has slots interlocking with the teeth; and
    the cable includes sleeve and a cord extending through the sleeve coaxially with the sleeve, the sleeve defining the slots.

18. The seat belt assembly of claim 17, further comprising a seat belt buckle connected to the cable.

19. The seat belt assembly of claim 17, wherein the torsion bar includes a base;
    each of the teeth has a catching side and a releasing side each extending from the base;
    the catching sides and the releasing sides each have an internal angle relative to the base; and
    the internal angle of each catching side is greater than the internal angle of each releasing side.

20. The seat belt assembly of claim 17, further comprising a bracket supporting the pretensioner and the torsion bar.

* * * * *